United States Patent
Kyung et al.

(10) Patent No.: US 12,285,752 B2
(45) Date of Patent: Apr. 29, 2025

(54) DOUBLE FLUIDIZED BED REACTOR SYSTEM INCLUDING STAIRCASE-TYPE HELICAL BLADE

(71) Applicant: Kuk Hyun Kyung, Seoul (KR)

(72) Inventors: Kuk Hyun Kyung, Seoul (KR); Sang Woo Kang, Seoul (KR)

(73) Assignee: Kuk Hyun Kyung, Seoul (KR)

( * ) Notice: Subject to any disclaimer, the term of this patent is extended or adjusted under 35 U.S.C. 154(b) by 490 days.

(21) Appl. No.: 17/759,711

(22) PCT Filed: Sep. 1, 2020

(86) PCT No.: PCT/KR2020/011693
§ 371 (c)(1),
(2) Date: Jul. 28, 2022

(87) PCT Pub. No.: WO2021/153871
PCT Pub. Date: Aug. 5, 2021

(65) Prior Publication Data
US 2023/0074981 A1    Mar. 9, 2023

(30) Foreign Application Priority Data
Jan. 28, 2020    (KR) .......................... 10-2020-0010069

(51) Int. Cl.
*B01J 8/26* (2006.01)
*B01D 45/16* (2006.01)
(Continued)

(52) U.S. Cl.
CPC ............... *B01J 8/26* (2013.01); *B01D 45/16* (2013.01); *B01J 8/0055* (2013.01); *B01J 8/006* (2013.01);
(Continued)

(58) Field of Classification Search
CPC ... B01J 8/26; B01J 8/0055; B01J 8/006; B01J 8/1836; B01J 8/228; B01J 2208/0084;
(Continued)

(56) References Cited

U.S. PATENT DOCUMENTS
2013/0067802 A1    3/2013    Seidel et al.

FOREIGN PATENT DOCUMENTS
JP    H09-024274 A    1/1997
KR    10-0804397 B1    2/2008
(Continued)

OTHER PUBLICATIONS

International Search Report issued in PCT/KR2020/011693; mailed May 7, 2021.

*Primary Examiner* — Huy Tram Nguyen
(74) *Attorney, Agent, or Firm* — Studebaker Brackett PLLC (57) ABSTRACT

A double fluidized bed reactor system including a staircase-type helical blade is proposed. The system includes a bubbling fluidized bed gasification furnace for receiving fuel (for example, combustible waste and biomass) and steam, forming a bubbling fluidized bed through a flow of flow medium therein, and gasifying the fuel, thereby generating a resultant gas, and a high-speed fluidized bed combustion furnace for receiving char of the resultant gas and the flow medium from the bubbling fluidized bed gasification furnace, additionally receiving air, combusting the char so as to heat the flow medium, and transferring the heated flow medium back to the bubbling fluidized bed gasification furnace.

16 Claims, 10 Drawing Sheets

(51) Int. Cl.
  *B01J 8/00* (2006.01)
  *B01J 8/18* (2006.01)
  *B01J 8/22* (2006.01)
  *C10J 3/52* (2006.01)
  *C10J 3/84* (2006.01)

(52) U.S. Cl.
  CPC .............. *B01J 8/1836* (2013.01); *B01J 8/228* (2013.01); *C10J 3/523* (2013.01); *C10J 3/84* (2013.01); *B01J 2208/0084* (2013.01)

(58) Field of Classification Search
  CPC .................. B01D 45/16; B01D 53/864; B01D 2255/2073; B01D 2255/20761; B01D 2257/104; C10J 3/523; C10J 3/84; C10J 3/56; C10J 2300/0906; C10J 2300/0916; C10J 2300/0976; C10J 2300/1637; C10J 2300/1807; C10J 3/482; C10J 3/487; C10J 3/82; C10B 51/00; C10B 49/10; C10B 53/02; C10K 1/024; C10K 1/026; C10K 1/002
  USPC ........................................................ 422/140
  See application file for complete search history.

(56) References Cited

FOREIGN PATENT DOCUMENTS

| KR | 10-0927875 B1 | 11/2009 |
| KR | 10-1068748 B1 | 9/2011 |
| KR | 10-1828458 B1 | 2/2018 |
| KR | 10-2019-0035264 A | 4/2019 |
| KR | 101993734 B1 * | 4/2019 |

\* cited by examiner

DOUBLE FLUIDIZED BED REACTOR SYSTEM INCLUDING STAIRCASE-TYPE HELICAL BLADE

CROSS-REFERENCE TO RELATED APPLICATIONS

This application is a U.S. National Phase Entry of International Application No. PCT/KR2020/011693 filed on Sep. 1, 2020, which claims benefit of priority to Korean Patent Application No. 10-2020-0010069 filed on Jan. 28, 2020, the entire content of which is incorporated herein by reference.

TECHNICAL FIELD

The present disclosure relates to a double fluidized bed reactor system including a helical gasification furnace. More particularly, the present disclosure relates to a double fluidized bed reactor system including a staircase-type helical gasification furnace, the double fluidized bed reactor system being capable of improving the efficiency of gas generation and the efficiency of tar removal by increasing the frequency of contact between a substance moving from an upper portion to a lower portion of the gasification furnace and a substance moving from the lower portion to the upper portion thereof with a helical blade in the gasification furnace formed in a discontinuous stairs shape.

BACKGROUND ART

As concerns about environmental pollution, fuel resource depletion, and global warming, are increased due to excessive use of fossil fuels, interest in developing alternative energy technologies that can continuously and stably produce energy is growing.

As part of the development of alternative energy, technology to produce energy using biomass is also receiving a lot of attention. Since carbon dioxide is converted into a carbon form through biomass during an energy production process using biomass, the alternative energy using biomass is recognized as the most effective alternative energy capable of reducing carbon dioxide emissions. Furthermore, when biomass is used as an alternative energy to replace fossil fuels, a sustainable global economic structure can be created while a coexistence effect of the environment, economy, and society can be achieved.

Biomass is a solid composed of C, H, and O, and gas composed of $H_2$, $CO$, $CH_4$, etc. is generated through pyrolysis of biomass. The gas generated as described above is supplied to a gas engine, a combined cycle power plant, etc., and serves as a raw material for generating electric energy, or hydrogen gas, synthetic natural gas, or biodiesel. In the gasification process, the overall reaction thereof is performed in a reducing atmosphere, unlike the general combustion method. Therefore, since emission of pollutants is small in the above process, the alternative energy can contribute to prevention of air pollution and increase of energy efficiency, and thus the alternative energy is in the spotlight as a next-generation clean use technology.

The gasification process is usually classified into drying, devolatilization, and gasification steps, and the drying step is performed by heating the biomass to 120° C., the devolatilization step in which volatile matter is blown away is performed when the biomass is heated to 350° C., and the char gasification reaction is performed when the biomass is heated to a temperature equal to or higher than 350° C.

Tar generated during the gasification reaction is formed such that part of the volatile matter produced in the pyrolysis process forms hydrocarbons with high molecular weight and low reactivity. The tar clogs a pipe at a rear end of the gasification furnace due to the property of condensing easily at low temperature, thereby reducing the efficiency of the process, and the tar enters a gas engine or a gas turbine and causes fouling and blocking effects, which lead to failure of the apparatus, thereby reducing overall process efficiency and increasing operating costs. Therefore, the concentration of tar generated in the gasification reaction should be kept as low as possible.

Tar removal methods may be divided into two typical methods.

A first method uses cyclone, filter, scrubber, etc. to physically or catalytically remove the tar contained in the gas generated in a reactor after the gasification process. In the method, when the gas generated in the reactor contains a lot of tar, the method should be operated by being equipped with a separate after-treatment facility for tar refining, so that the method is inefficient in terms of cost.

A second method removes the tar in the reactor by adjusting various conditions in the gasification process. The method uses the double fluidized bed reactor to generate gas and at the same time remove the tar, and has a problem in that the tar removal efficiency is removed due to insufficient contact between the tar and the flow medium capable of the tar.

Therefore, there is a need to develop a double fluidized bed reactor that can improve the tar removal efficiency by increasing the contact ratio between the tar and the flow medium in the double fluidized bed reactor.

DISCLOSURE

Technical Problem

An objective of the present disclosure is to provide a double fluidized bed reactor system including a gasification furnace including a staircase-type helical blade, wherein the helical blade in the gasification furnace is formed in a discontinuous stairs shape so as to increase the frequency of contact between a substance moving from an upper portion to a lower portion of the gasification furnace and a substance moving from the lower portion to the upper portion thereof, thereby improving the gas generation efficiency and the tar removal efficiency.

Technical Solution

According to an embodiment of the present disclosure, a double fluidized bed reactor system includes: a double fluidized bed reactor system including a staircase-type helical blade, the double fluidized bed reactor system including: a fuel tank configured to store fuel; a bubbling fluidized bed gasification furnace configured to receive the fuel from the fuel tank and steam from a lower portion thereof, to form a bubbling fluidized bed through a flow of flow medium therein, and to gasify the fuel, thereby generating a resultant gas; a high-speed fluidized bed combustion furnace configured to receive the flow medium and char contained in the resultant gas from the bubbling fluidized bed gasification furnace, additionally receive air, to combust the char so as to heat the flow medium, and to transfer the heated flow medium back to the bubbling fluidized bed gasification furnace; a resultant gas cyclone communicating with the bubbling fluidized bed gasification furnace, and configured to separate fine particles from the resultant gas discharged from the bubbling fluidized bed gasification furnace and to introduce the fine particles back to the bubbling fluidized bed gasification furnace and to discharge a remaining part of the resultant gas; and an exhaust gas cyclone connected to both an upper portion of the high-speed fluidized bed combustion furnace and an upper portion of the bubbling fluidized bed gasification furnace while being located therebetween, and after separating the flow medium from the exhaust gas, discharging the exhaust gas and transferring the flow medium to the bubbling fluidized bed gasification furnace, wherein the bubbling fluidized bed gasification furnace may include: a center rod located inside the bubbling fluidized bed gasification furnace in a vertical direction along a center portion thereof; and a helical blade configured to move the resultant gas and the steam as a vortex along the center rod, wherein the helical blade may include a plurality of unit blades radially coupled to the center rod, and respective unit blades may be spaced apart from each other and arranged in a staircase type.

A section of each of the unit blades, the section being perpendicular to a surface formed by a center shaft of the center rod and a longitudinal shaft of the unit blade, may be a polygon.

The unit blade may be arranged while rotating at a predetermined angle around the longitudinal shaft of the unit blade, and the section of the unit blade may have a shape inclined with respect to a bottom surface.

The predetermined angle may be 40°~80°.

A gap between two adjacent unit blades may be formed such that a distance between uppermost ends of the two unit blades in the gap may be 2~7 times longer than a distance between lowest ends thereof.

The gap between the two adjacent unit blades may be formed to be tapered from the uppermost ends of the two unit blades to the lowest ends thereof in the gap.

A minimum width of the gap between the two adjacent unit blades may be 5~25 mm.

The high-speed fluidized bed combustion furnace may be configured to be additionally supplied with an external fuel.

The helical blades may be arranged with 2~5 rows when being observed at one side thereof.

Each of the unit blades may include an extension part formed to be inclined downward on at least one of lower edges of the unit blade.

The double fluidized bed reactor system may include; a circulation line through which for the exhaust gas discharged from the exhaust gas cyclone may be supplied to the fuel tank.

Some of the exhaust gas discharged from the exhaust gas cyclone may be supplied to the fuel tank after being de-oxygenated.

The de-oxygenated exhaust gas may be supplied as a purge gas of a filter, the purge gas removing dust and HCI contained in the resultant gas.

The some of the exhaust gas discharged from the exhaust gas cyclone may be de-oxygenated through a low temperature oxidation catalyst.

The low temperature oxidation catalyst may be filled in a packed tower.

The packed tower may be additionally supplied with a liquid propane gas (LPG) or a liquefied natural gas (LNG).

The bubbling fluidized bed gasification furnace and the high-speed fluidized bed combustion furnace may be arranged to be spaced apart from each other.

The bubbling fluidized bed gasification furnace may be formed to surround the high-speed fluidized bed combustion furnace.

Advantageous Effects

According to the present disclosure, the double fluidized bed reactor system including the staircase-type helical gasification furnace is configured such that the frequency of contact between the tar and the flow medium is increased substantially, so that the generation efficiency of the resultant gas and the tar removal efficiency are excellent.

MODE FOR INVENTION

Prior to describing in detail through a preferred embodiment of the present disclosure below, it should be noted that the terms and words used in the specification and the claims should not be construed as being limited to ordinary meanings or dictionary definitions, and interpreted as meaning and concept consistent with the technical spirit of the present disclosure.

In order to clearly describe the present invention proposed in the drawings, parts irrelevant to the description are omitted, and the similar reference numerals refer to similar elements throughout. Furthermore, as used herein, the term "unit" refers to one unit or block that performs a specific function.

In the present specification, the term "and/or" refers to mean including at least one of elements listed before and after. Furthermore, the term "connected/coupled" refers to the meaning of including being directly connected to another element or indirectly connected to the other element with intervening element located therebetween.

As used herein, the singular forms "a", "an" and "the" are intended to include the plural forms as well, unless the context clearly indicates otherwise. Furthermore, elements, steps, and operations referred to as "include" or "including" mean the presence or addition of one or more other elements, steps, and operations.

Hereinbelow, a preferred embodiment of the present disclosure will be described. However, the scope of the present disclosure is not limited to the preferred embodiment below, and those skilled in the art will implement various modifications, additions and substitutions within the scope and spirit of the present disclosure.

Figure 1:
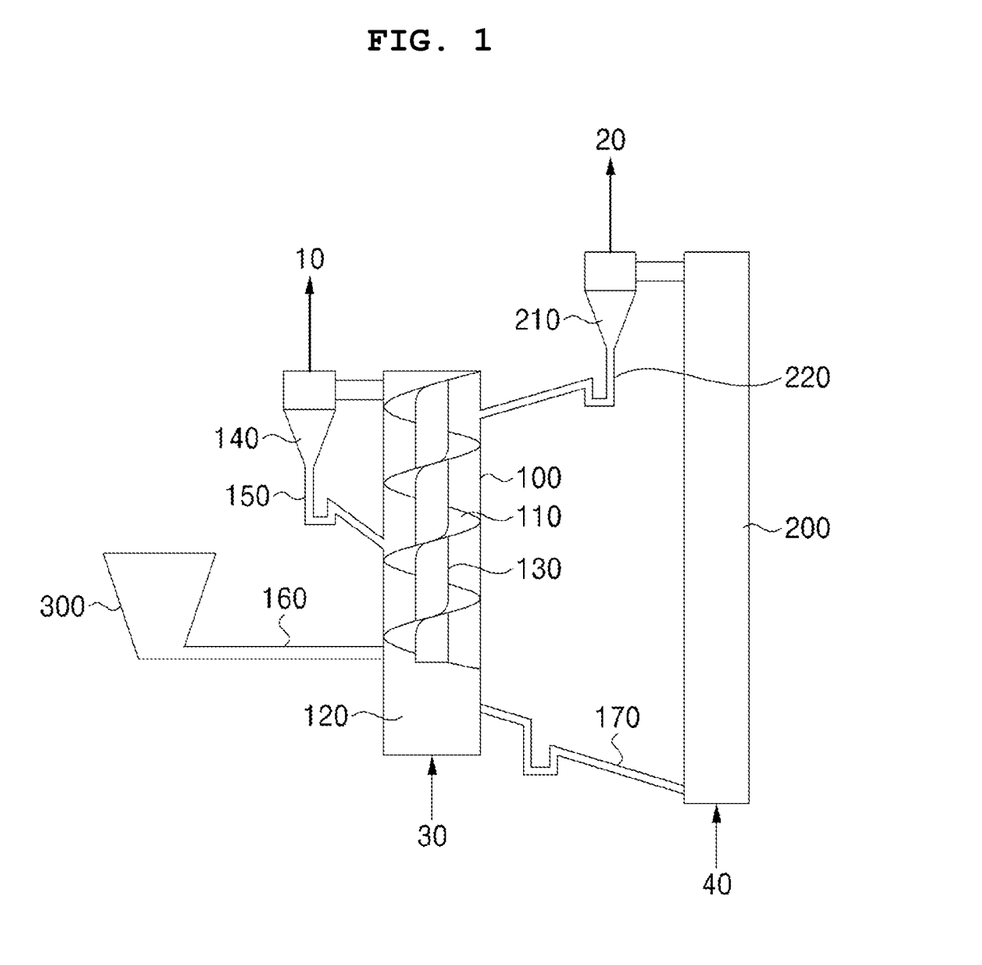
FIG. 1 is a view schematically showing a double fluidized bed reactor system including a staircase-type helical gasification furnace according to an embodiment of the present disclosure.

FIG. 1 is a view schematically showing a double fluidized bed reactor system including a staircase-type helical gasification furnace according to an embodiment of the present disclosure.

According to the embodiment of the present disclosure, the double fluidized bed reactor system including a staircase-type helical gasification furnace includes: a bubbling fluidized bed gasification furnace 100, a high-speed fluidized bed combustion furnace 200, and a fuel tank 300. When biomass, which is a fuel, is transferred from the fuel tank 300 into the bubbling fluidized bed gasification furnace 100, the fuel is pyrolyzed in the bubbling fluidized bed gasification furnace 100 to generate a resultant gas 10, and the high-speed fluidized bed combustion furnace 200 is configured to receive char of the resultant gas 10 and a flow medium from the bubbling fluidized bed gasification furnace 100 to combust the char, thereby heating the flow medium, and then to transfer the flow medium into the bubbling fluidized bed gasification furnace 100 so as to transfer heat to the bubbling fluidized bed gasification furnace 100.

The fuel tank 300 is a unit configured to store fuel substances such as combustible waste, biomass, coal, and sludge, and these fuel substances may be supplied into the bubbling fluidized bed gasification furnace 100 through a fuel inlet 160.

The bubbling fluidized bed gasification furnace 100 is a unit configured to receive and pyrolyze the fuel from the fuel tank 300 so as to generate the resultant gas 10, and generate useful substances such as H 2, CO, CH 4, etc. as well as tar and char. The tar generated in the bubbling fluidized bed gasification furnace is removed by being pyrolyzed inside the bubbling fluidized bed gasification furnace 100, and the char is transferred into the high-speed fluidized bed combustion furnace 200 and is used as a combustion fuel to heat the flow medium.

The resultant gas 10 discharged from the bubbling fluidized bed gasification furnace 100 contains useful gas components such as H2, CO, CH4, etc. and may include fine particles such as the tar and crushed particles of the flow medium. These fine particles are separated through a resultant gas cyclone 140 that communicates with the bubbling fluidized bed gasification furnace 100, and the fine particles flow back to the bubbling fluidized bed gasification furnace 100, and remaining resultant gas 10 without the fine particles is discharged into an after-treatment device.

The resultant gas 10 discharged from the resultant gas cyclone 140 is changed in response to the type of the flow medium, and as the resultant gas contains hydrogen in a proportion of about 40~70%, the resultant gas may be used as a hydrogen fuel, and olivine or calcium oxide (CaO) may be used as the flow medium.

The high-speed fluidized bed combustion furnace 200 is a unit configured to receive char and the flow medium from the bubbling fluidized bed gasification furnace 100 and to combust the char so as to heat the flow medium. The heated flow medium and an exhaust gas 20 generated in the combustion process are separated from each other through an exhaust gas cyclone 210, and the heated flow medium is supplied back to the bubbling fluidized bed gasification furnace 100 through an exhaust gas cyclone connection tube 220 and serves as a heating source, and the exhaust gas 20 is discharged.

As described above, the fuel such as combustible waste, biomass, coal, sludge, etc. is gasified by a gasification system consisting of a series of sequential devices consisting of the bubbling fluidized bed gasification furnace 100 and the high-speed fluidized bed combustion furnace 200.

The bubbling fluidized bed gasification furnace 100 is a part configured to pyrolyze and gasify the fuel such as combustible waste, biomass, coal, sludge, etc., and steam 30, which is an oxidizing agent, is sprayed at a lower portion of the bubbling fluidized bed gasification furnace 100 so as to form the bubbling fluidized bed 120, and the substances such as combustible waste, biomass, coal, sludge, etc. are pyrolyzed and gasified to be converted into the resultant gas 10. Herein, the combustible waste may include waste wood crushed to a size of 5~8 cm, plastic or vinyl, etc.

Inside the bubbling fluidized bed gasification furnace 100, a center rod 130 is securely installed in a long shape in a vertical direction along the center portion of the bubbling fluidized bed gasification furnace 100 above the bubbling fluidized bed 120, and a helical blade 110 having a screw blade shape is coupled around the center rod 130, and it is preferable that a fluid flows as a vortex inside the bubbling fluidized bed gasification furnace 100.

As the frequency of contact between the resultant gas 10 and the flow medium is increased by the helical blade 110, contact reaction between the tar in the resultant gas 10 and the flow medium is increased. The helical blade 110 may be formed in a helical shape such that a plurality of unit blades 111 is radially coupled to the center rod 130, and be spaced apart from each other and be arranged in the staircase type as described later.

When the helical blade 110 is observed at one side thereof, the helical blade 110 may be formed to be arranged in 2~5 rows. When the number of rows is equal to or less than one row, the frequency of contact and the efficiency of reaction between the reactant such as the fuel and the flow medium flowing from the top to the bottom and the gas flowing from the bottom to the top is reduced, thereby reducing the generation efficiency of the resultant gas 10 and the tar removal efficiency. When the number of rows is greater than 6 rows, a spacing between one row and another row is narrowed and the pressure loss of the gas raised while whirling along the helical blade 110 is increased, so that there may be a problem in which a flow of the gas is not smooth.

Meanwhile, the char and the flow medium are transferred from the lower portion of the bubbling fluidized bed gasification furnace 100 to the high-speed fluidized bed combustion furnace 200. Air is introduced from a lower portion of the high-speed fluidized bed combustion furnace 200 so as to combust the char, and the high-speed fluidized bed combustion furnace 200 is operated with a fast bed at high speed. The temperature of the flow medium transferred to the high-speed fluidized bed combustion furnace 200 at the lower portion of the bubbling fluidized bed gasification furnace 100 was 820~850° C., but the temperature of the flow medium rises to 920~950° C. as passing through the high-speed fluidized bed combustion furnace 200, thereby being re-introduced into the bubbling fluidized bed gasification furnace 100 as a high temperature heat source.

Herein, when necessary, an external fuel may be additionally supplied into the high-speed fluidized bed combustion furnace 200, and the resultant gas 10 that is discharged through the resultant gas cyclone 140 may be used as the external fuel.

The gas passing through the high-speed fluidized bed combustion furnace 200 loses the flow medium and ashes by the exhaust gas cyclone 210 connected to an upper portion of the high-speed fluidized bed combustion furnace 200. The flow medium changed into high temperature in the high-speed fluidized bed combustion furnace 200 is transferred to an upper portion of the bubbling fluidized bed gasification furnace 100 while passing through the exhaust gas cyclone 210, and then the flow medium is used as a heat source for gasification reaction of the bubbling fluidized bed gasification furnace 100. The exhaust gas 20 generated in the combustion process is discharged to the outside space through the exhaust gas cyclone 210.

Figure 2:
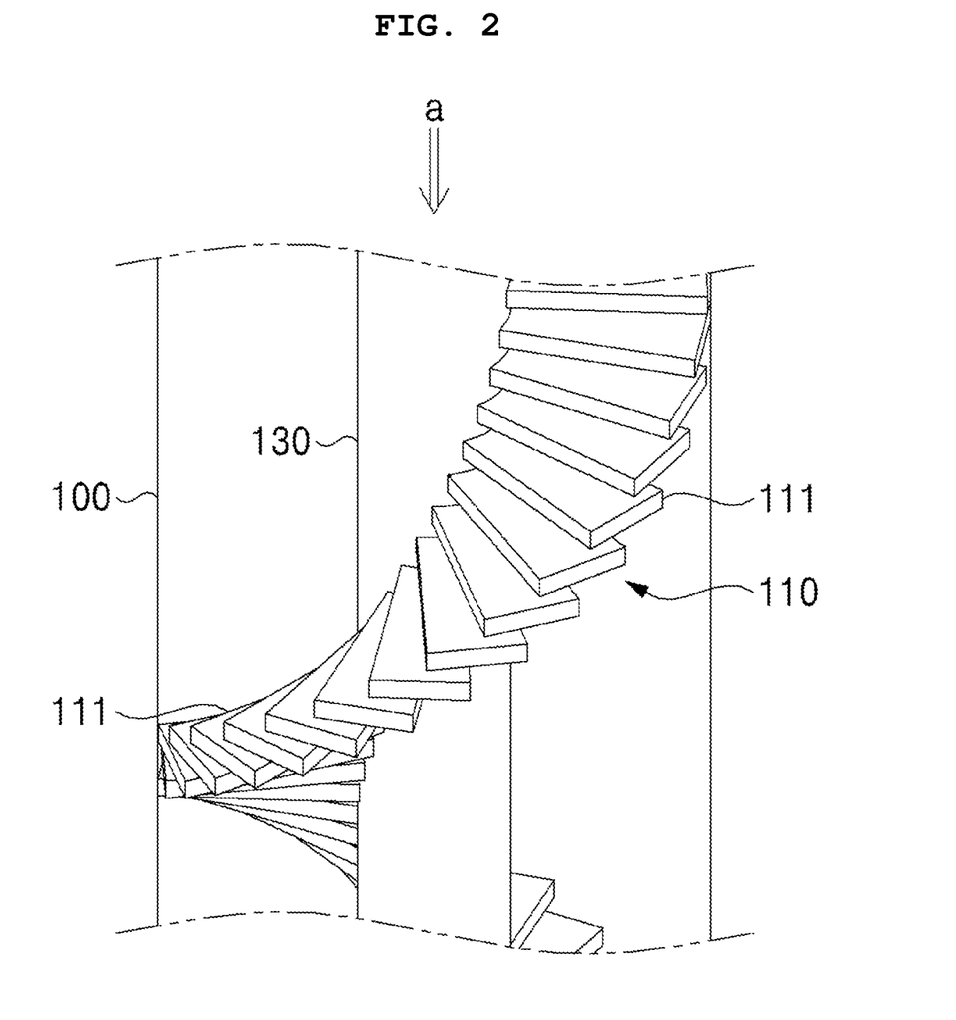
FIG. 2 is a view showing the inside space of the staircase-type helical gasification furnace of the present disclosure in detail.

FIG. 2 is a view showing the inside space of the bubbling fluidized bed gasification furnace 100 of the present disclosure in detail. The plurality of unit blades 111 are radially coupled to the center rod 130, and are spaced apart from each other in the staircase type to form the helical blade 110.

Therefore, macroscopically, the flow medium descends while turning along the helical blade 110 by the screw-shaped helical blade 110, the gas components including the resultant gas 10 and the steam 30 moves upward while turning along the helical blade 110. At the same time, microscopically, the reactant falls into a gap that is an empty space between the unit blades 111 discontinuously arranged, thereby being in frequent and effective contact with the gas components moving upward while turning, so that the generation efficiency of the resultant gas 10 and the tar removal efficiency are improved substantially.

Figure 3:
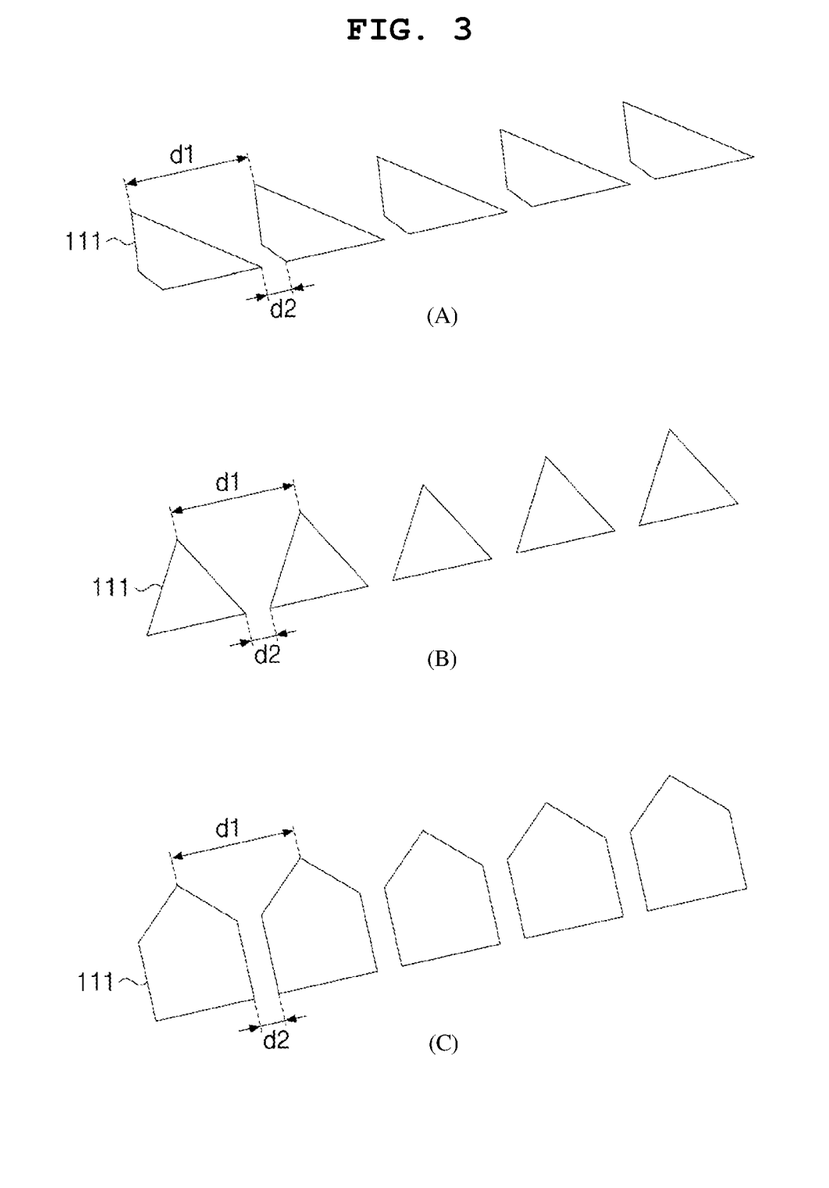
FIG. 3 is a view showing modified examples of sectional shapes of unit blades constituting a helical blade of the present disclosure.

Herein, a section of each of the unit blades 111 perpendicular to a surface formed by a center shaft of the center rod 130 and the longitudinal shaft of the unit blades 111 is a polygon, and the section of each of the unit blades 111 may have a rectangular shape, as shown in FIG. 2, and may have shapes such as shapes of triangular, trapezoidal, pentagonal, etc., shown in FIG. 3, and may be formed in a polygon other than the presented shape in the drawing.

Figure 4:
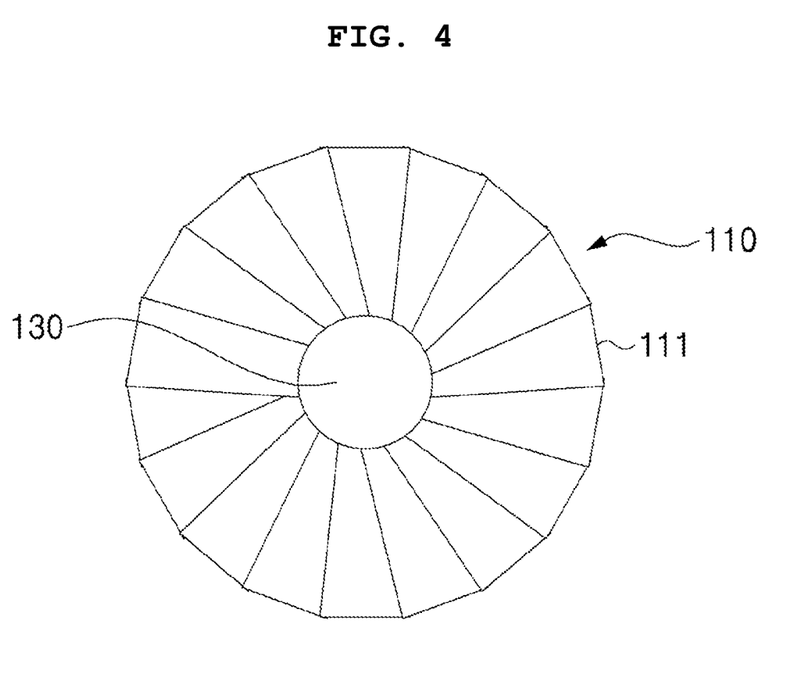
FIG. 4 is a top view showing the inside space of the helical gasification furnace of the staircase type according to the present disclosure (in direction a).

FIG. 4 is a top view showing the bubbling fluidized bed gasification furnace 100 observed in the direction a in FIG. 2. Two adjacent unit blades 111 of the helical blade 110 overlap with each other in some areas, and when observed from the top it is observed that an empty space does not exist between the two unit blades 111. However, in reality, the unit blades 111 are arranged discontinuously, so that a gap that is an empty space exists between the unit blades 111.

Figure 5:
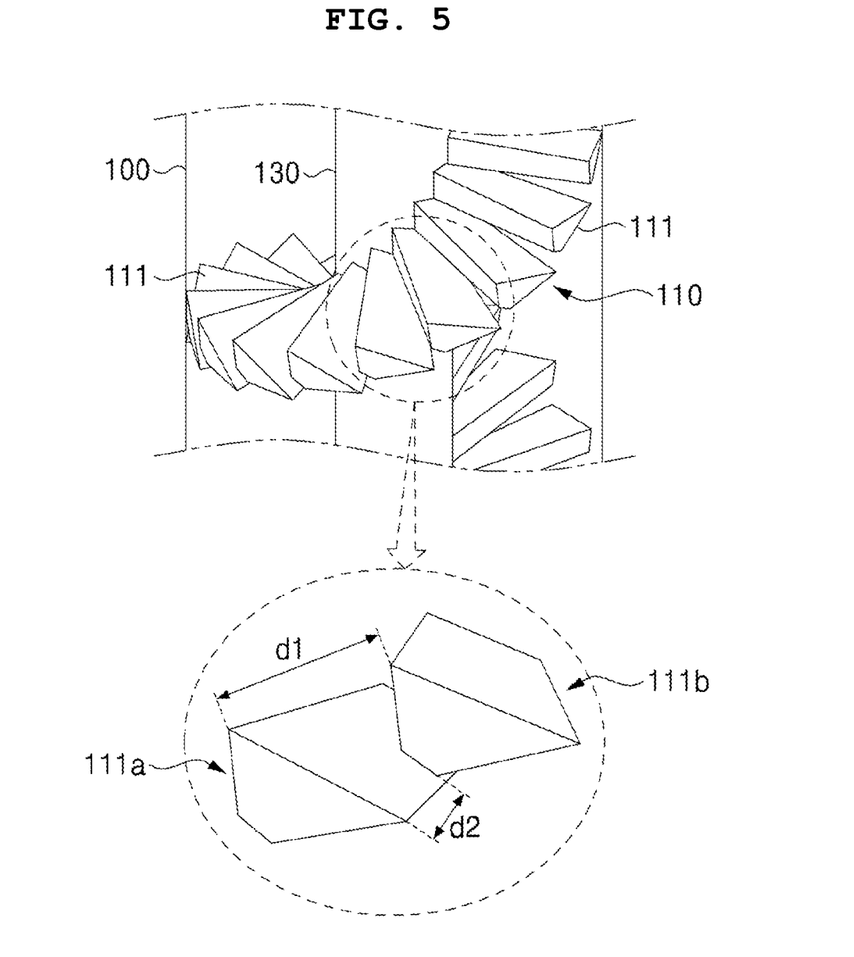
FIG. 5 is a view showing an example in which sections of the unit blades constituting the helical blade of the present disclosure have similar trapezoids.

FIG. 5 is a view showing the helical blade 110 of which the unit blades 111 are formed to have a trapezoidal section.

Each of the unit blades 111 has a polygonal section as described above, and it is preferable that the gap that is an empty space between the unit blades 111 has a shape that is gradually narrowed in a downward direction.

Referring to the enlarged view of FIG. 5, in the gap, when a distance (d1) between uppermost ends of the two adjacent unit blades 111a and 111b is formed larger than a distance (d2) between lowest ends thereof, a back-flow effect in which the gas components rise through the gap is prevented, so that it is preferable that the d1 is formed larger than the d2.

Specifically, the d1 may be formed to have 2~7 times a value of the d2, and when a distance ratio between the d1 and the d2 deviates from the range, reaction efficiency improvement effect due to falling delay of the flow medium falling through the gap is insignificant, so that it is preferable that the d1 and the d2 are formed to have the above described distance ratio.

Furthermore, as a diameter of the flow medium falling to the gap is about 0.4~0.8 mm, in order to prevent a fouling effect due to the flow medium, it is preferable that the minimum width of the gap between the two adjacent unit blades 111a and 111b is formed within a range of 5~25 mm.

Specifically, it is preferable that the width of the gap is formed to be tapered from the uppermost ends to the lowest ends of the unit blades 111a and 111b, and in this case, a fluid flow of the flow medium falling through the gap is smoother, and it is possible to prevent the back-flow effect, in which the gas components rise through the gap, and the fouling effect caused by the back-flow effect.

Figure 6:
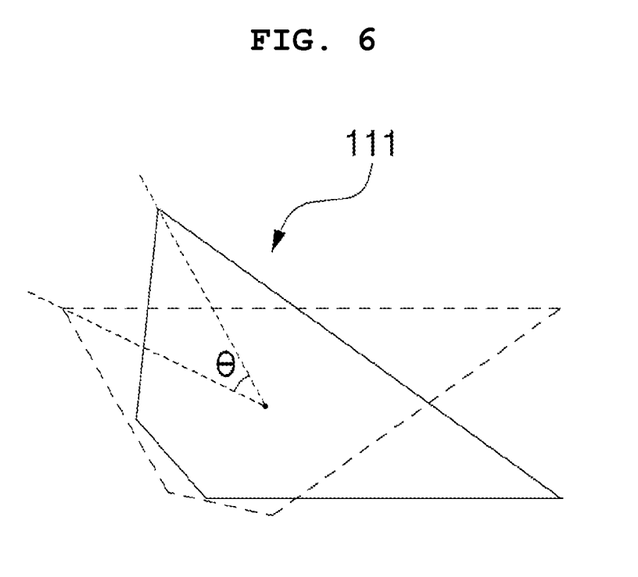
FIG. 6 is a view showing an example of a section of each of the unit blades constituting the helical blade of the present disclosure.

FIG. 6 is a view showing an example of a section of each of the unit blades 111 constituting the helical blade 110 of the present disclosure. Each of the unit blades 111 is arranged while rotating at a predetermined angle θ around the longitudinal direction of the unit blade 111, and may be arranged to be inclined with respect to the bottom surface, and the predetermined angle θ may be 40~80.

The unit blades 111 are arranged as described above, two surfaces extended from one edge located at the uppermost portion of each of the unit blades 111 are formed to be inclined downward in different directions. Accordingly, as the flow medium descending while turning along the helical blade 110 moves along the downward inclined two surfaces, the reactant is prevented from falling excessively fast through the gap and thus the time of contact between the reactant, the resultant gas 10, and the steam 30 is extended so that the effect of improving the reaction efficiency can be obtained.

Figure 7:
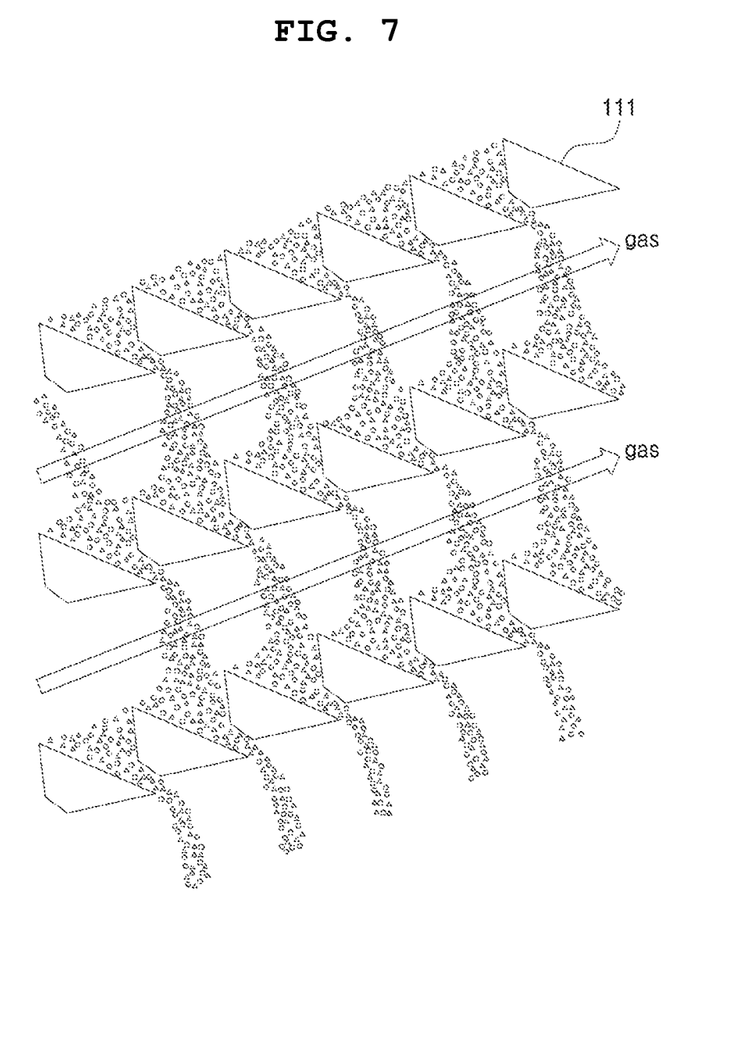
FIG. 7 is a view showing a fluid flow inside the staircase-type helical gasification furnace of the present disclosure.

Meanwhile, FIG. 7 is a view schematically showing a fluid flow of the gas components containing the flow medium, the resultant gas 10, the steam 30, etc. when the unit blades 111 has a similar trapezoidal section.

As shown in FIG. 7, some of the flow medium stay in the gap between the unit blades 111 and react in contact with the gas components at an upper area of the gap, and some of the reactant passes through the gap and falls and reacts in contact with the gas components. As described above, as the frequency of contact between the flow medium and the gas components is increased substantially, the generation efficiency of the resultant gas 10 and the tar removal efficiency can be increased substantially.

Figure 8:
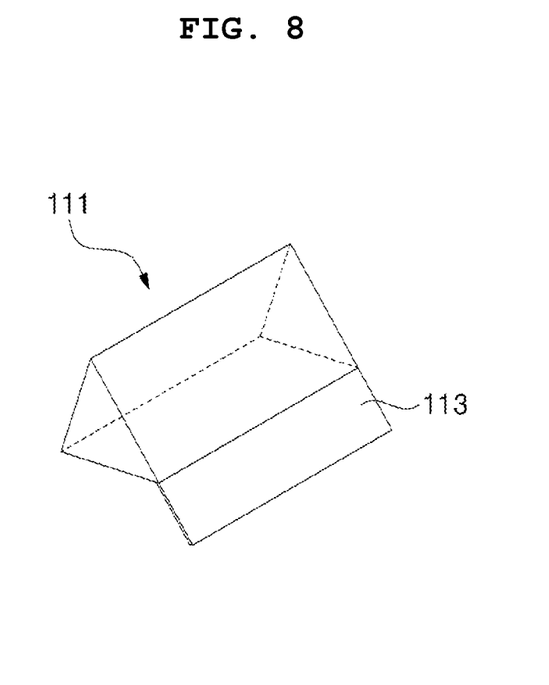
FIG. 8 is a view showing an example of each of the unit blades constituting the helical blade of the present disclosure.

FIG. 8 is a view showing an example of each of the unit blades constituting the helical blade of the present disclosure. Each of the unit blades 111 may include an extension part 113 formed to be inclined downward on at least one of lower edges of the unit blade 111.

As described above, when the extension part 113 is provided, the flow medium moves along the extension part 113, so that the reactant is prevented from falling to a lower portion of the gap due to a surface tension and the fouling effect in which the gap is closed as well as the falling time of the flow medium is delayed. Accordingly, the contact time between the flow medium, the steam 30, and the resultant gas 10 is increased, and thus the reaction efficiency can be improved.

As an example, the extension part 113 may be installed all the unit blades 111, may be installed only to some of the unit blades 111, or a plurality of extension parts may be installed to one unit blade 111. It is preferable that the extension part 113 is installed to have a regular pattern, and irregular installation of the extension part is possible. As long as the shape allows the flow medium to fall to the lower portion of the gap and does not close the gap, the shape or the number thereof may be formed without being particularly limited.

Figure 9:
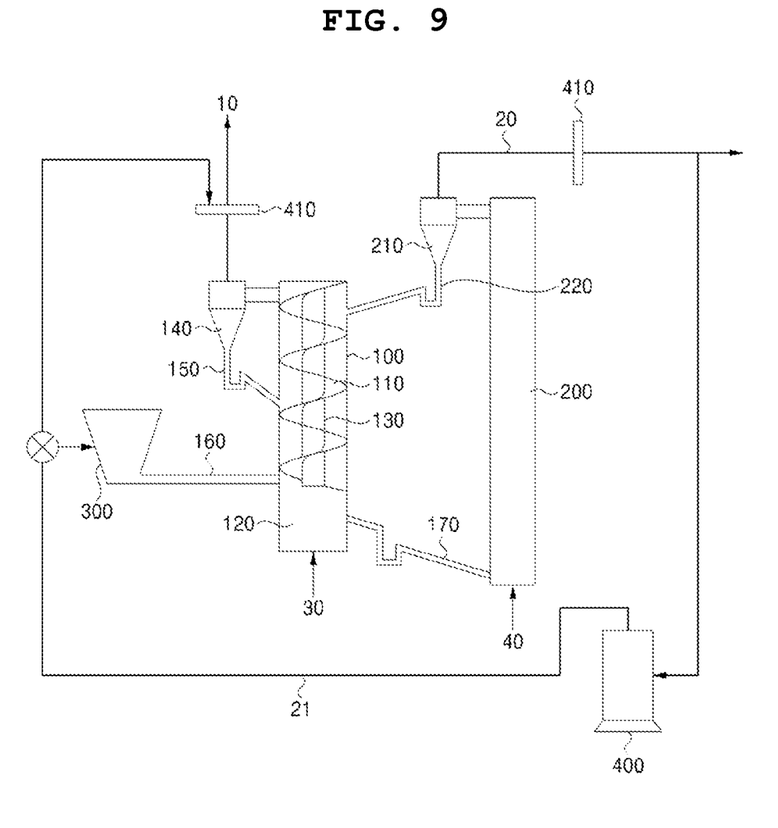
FIG. 9 is a view schematically showing the double fluidized bed reactor system including the staircase-type helical gasification furnace according to another embodiment of the present disclosure.

Meanwhile, FIG. 9 is a view schematically showing the double fluidized bed reactor system including the staircase-type helical gasification furnace according to another embodiment of the present disclosure. According to the another embodiment, the double fluidized bed reactor system includes a circulation line, and the circulation line allows the exhaust gas 20 discharged through the exhaust gas cyclone 210 of the double fluidized bed reactor system including the staircase-type helical gasification furnace, as described with reference to FIG. 1, to be recirculated through an exhaust gas line 21 to be supplied to a fuel tank 300. Therefore, as the fuel of the fuel tank 300 is heated first by heat of the exhaust gas 20, the efficiency of gasification in the bubbling fluidized bed gasification furnace 100 can be further improved.

The exhaust gas 20 generated through the combustion process in the high-speed fluidized bed combustion furnace 200 contains oxygen of about 3~5 vol %. As described above, when the exhaust gas 20 is supplied into the fuel tank 300 while containing oxygen, heat accumulates in the fuel stored in the fuel stored in the fuel tank 300, and may cause spontaneous combustion. Therefore, in order to remove oxygen contained in the exhaust gas 20, the exhaust gas 20 supplied into the fuel tank 300 is allowed to pass through a packed tower 400 filled with the low temperature oxidation catalyst.

Herein, Cu, Mn, etc. may be used as the low temperature oxidation catalyst filled in the packed tower, and the low temperature oxidation catalyst is oxidized at low temperature less than equal to about 100° C., and so that oxygen contained in the exhaust gas 20 can be removably removed.

Furthermore, in order to selectively and sufficiently remove oxygen contained in the exhaust gas 20, it is possible to additionally supply a small amount of a liquid propane gas (LPG), a liquefied natural gas (LNG) or the like into the packed tower 400.

As described above, as the exhaust gas 20 passes through the packed tower 400 filled with the low temperature oxidation catalyst, oxygen contained in the exhaust gas 20 can be efficiently removed. The exhaust gas 20 without oxygen is supplied back to the fuel tank 300, the fuel tank 300 stored the fuel may remain in an anaerobic condition, so that factors, which may hinder an operation of a stable process, such as spontaneous combustion can be effectively removed.

In addition, as the exhaust gas 20 de-oxygenated as described above is supplied from the fuel tank 300 into the bubbling fluidized bed gasification furnace 100 together with fuel components to help maintain the anaerobic condition of the oxygen-free or hypoxic condition in the bubbling fluidized bed gasification furnace 100.

Furthermore, the exhaust gas 20 from which oxygen is removed as described above may be supplied as a purge gas of a filter 410 to remove dust and HCl contained in the resultant gas 10.

When necessary, the exhaust gas 20 discharged through the exhaust gas cyclone 210 may be supplied into the packed tower 400 through the filter 410. As foreign materials contained in the exhaust gas 20 is removed through the filter 410 in advance, it is possible to prevent the low temperature oxidation catalyst filled in the packed tower 400 from being polluted.

Figure 10:
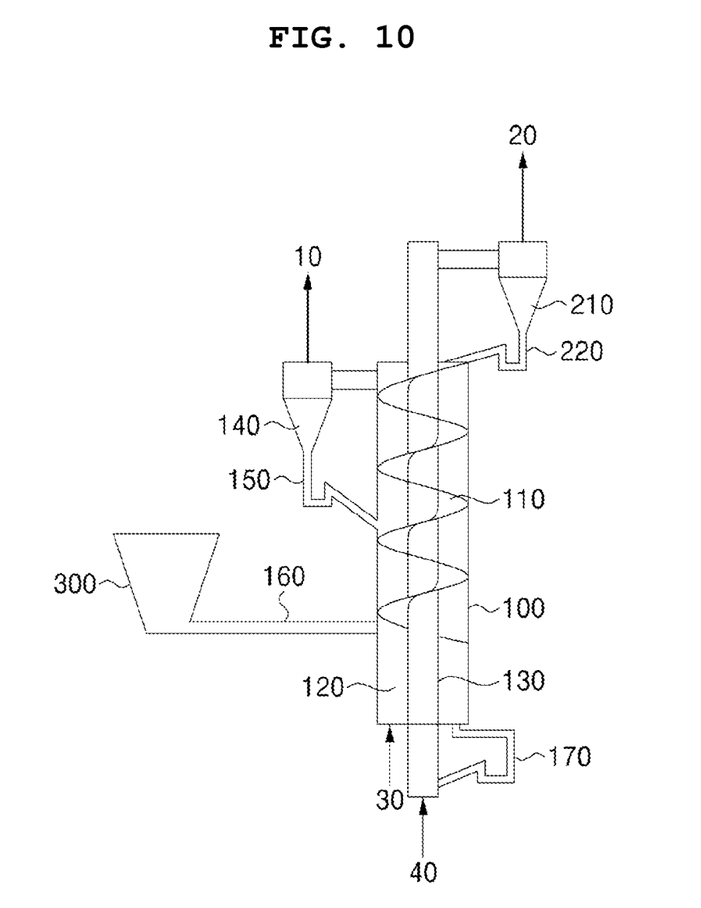
FIG. 10 is a view schematically showing the double fluidized bed reactor system including the staircase-type helical gasification furnace according to a further embodiment of the present disclosure.

Meanwhile, according to the embodiment of the present disclosure shown in FIG. 1, the bubbling fluidized bed gasification furnace 100 and the high-speed fluidized bed combustion furnace 200 are separated from each other, but according to the another embodiment of the present disclosure shown in FIG. 10, the bubbling fluidized bed gasification furnace 100 is shaped to surround the high-speed fluidized bed combustion furnace 200.

According to the another embodiment of the present disclosure shown in FIG. 10, in the double fluidized bed reactor system including the staircase-type helical gasification furnace, the high-speed fluidized bed combustion furnace 200 is located in the center rod 130 of the helical blade 110 provided in the bubbling fluidized bed gasification furnace 100, and as heat is transferred to the bubbling fluidized bed gasification furnace 100 through a wall of the high-speed fluidized bed combustion furnace 200 at high temperature, heat transfer is maximized and heat loss is minimized, thereby reducing operating costs of the gasification apparatus.

Furthermore, according to the another embodiment of the present disclosure shown in FIG. 10, the exhaust gas 20 of the double fluidized bed reactor system including the helical blade may be also de-oxygenated while passing through the packed tower 400 filled with the low temperature oxidation catalyst and then be recirculated into the fuel tank 300. The description as described above overlaps with the description of the another embodiment of FIG. 9 and will be omitted herein.

The present disclosure is not limited to the specific embodiments and description as described above, and ordinary skill in the art to which this invention belongs will appreciate that various modifications, additions and substitutions are possible, without departing from the scope and spirit of the invention as disclosed in the accompanying claims, and the modifications exist in the patent right of the present disclosure.

INDUSTRIAL APPLICABILITY

The present disclosure relates to the double fluidized bed reactor system including the staircase-type helical gasification furnace, and the double fluidized bed reactor system is configured to improve the gas generation efficiency and the tar removal efficiency with the helical blade in the gasification furnace formed in the discontinuous stairs shape so as to increase the frequency of contact between the substance moving from the upper portion to the lower portion of the gasification furnace and the substance moving from the lower portion to the upper portion of the gasification furnace. As the frequency of contact between the tar and the flow medium increases substantially and the generation efficiency of the resultant gas and the tar removal efficiency are improved, industrial applicability is possible.

The invention claimed is:
1. A double fluidized bed reactor system comprising a staircase-type helical blade, the double fluidized bed reactor system comprising:
 a fuel tank configured to store fuel;
 a bubbling fluidized bed gasification furnace configured to receive the fuel from the fuel tank and steam from a lower portion thereof, to form a bubbling fluidized bed through a flow of flow medium therein, and to gasify the fuel, thereby generating a resultant gas;
 a high-speed fluidized bed combustion furnace configured to receive the flow medium and char contained in the resultant gas from the bubbling fluidized bed gasification furnace, additionally receive air, to combust the char so as to heat the flow medium, and to transfer the heated flow medium back to the bubbling fluidized bed gasification furnace;

a resultant gas cyclone communicating with the bubbling fluidized bed gasification furnace, and configured to separate fine particles from the resultant gas discharged from the bubbling fluidized bed gasification furnace and to introduce the fine particles back to the bubbling fluidized bed gasification furnace and to discharge a remaining part of the resultant gas; and an exhaust gas cyclone connected to both an upper portion of the high-speed fluidized bed combustion furnace and an upper portion of the bubbling fluidized bed gasification furnace while being located therebetween, and after separating the flow medium from the exhaust gas, discharging the exhaust gas and transferring the flow medium to the bubbling fluidized bed gasification furnace, wherein the bubbling fluidized bed gasification furnace comprises: a center rod located inside the bubbling fluidized bed gasification furnace in a vertical direction along a center portion thereof; and a helical blade configured to move the resultant gas and the steam as a vortex along the center rod, the helical blade comprises a plurality of unit blades radially coupled to the center rod, and respective unit blades are spaced apart from each other and arranged in a staircase type, a section of each of the unit blades, the section being perpendicular to a surface formed by a center shaft of the center rod and a longitudinal shaft of the unit blade, is a polygon, and some of the exhaust gas discharged from the exhaust gas cyclone is de-oxygenated through a low temperature oxidation catalyst and then supplied into the fuel tank.

2. The double fluidized bed reactor system of claim 1, wherein the unit blade is arranged while rotating at a predetermined angle around the longitudinal shaft of the unit blade, and the section of the unit blade has a shape inclined with respect to a bottom surface.

3. The double fluidized bed reactor system of claim 2, wherein the predetermined angle is 40°~80°.

4. The double fluidized bed reactor system of claim 1, wherein a gap between two adjacent unit blades is formed such that a distance between uppermost ends of the two unit blades in the gap is 2~7 times longer than a distance between lowest ends thereof.

5. The double fluidized bed reactor system of claim 4, wherein the gap between the two adjacent unit blades is formed to be tapered from the uppermost ends of the two unit blades to the lowest ends thereof in the gap.

6. The double fluidized bed reactor system of claim 4, wherein a minimum width of the gap between the two adjacent unit blades is 5~25 mm.

7. The double fluidized bed reactor system of claim 1, wherein the high-speed fluidized bed combustion furnace is configured to be additionally supplied with an external fuel.

8. The double fluidized bed reactor system of claim 1, wherein the helical blades are arranged with 2~5 rows when being observed at one side thereof.

9. The double fluidized bed reactor system of claim 1, wherein each of the unit blades comprises an extension part formed to be inclined downward on at least one of lower edges of the unit blade.

10. The double fluidized bed reactor system of claim 1, further comprising:
a circulation line through which for the exhaust gas discharged from the exhaust gas cyclone is supplied to the fuel tank.

11. The double fluidized bed reactor system of claim 10, wherein some of the exhaust gas discharged from the exhaust gas cyclone is supplied to the fuel tank after being de-oxygenated.

12. The double fluidized bed reactor system of claim 11, wherein the de-oxygenated exhaust gas is supplied as a purge gas of a filter, the purge gas removing dust and HCl contained in the resultant gas.

13. The double fluidized bed reactor system of claim 1, wherein the low temperature oxidation catalyst is filled in a packed tower.

14. The double fluidized bed reactor system of claim 13, wherein the packed tower is additionally supplied with a liquid propane gas (LPG) or a liquefied natural gas (LNG).

15. The double fluidized bed reactor system of claim 1, wherein the bubbling fluidized bed gasification furnace and the high-speed fluidized bed combustion furnace are arranged to be spaced apart from each other.

16. The double fluidized bed reactor system of claim 1, wherein the bubbling fluidized bed gasification furnace is formed to surround the high-speed fluidized bed combustion furnace.

* * * * *